United States Patent [19]
Cunningham

[11] 3,942,117
[45] Mar. 2, 1976

[54] ALL SATURATED SWITCHING MODE SOLID STATE RF AMPLIFIER

[75] Inventor: Paul M. Cunningham, Richardson, Tex.

[73] Assignee: Spectradyne, Inc., Richardson, Tex.

[22] Filed: Dec. 17, 1973

[21] Appl. No.: 425,253

[52] U.S. Cl. ......... 325/161; 178/DIG. 13; 307/215; 307/239; 325/308
[51] Int. Cl.² .................. H04L 27/04; H03K 19/36
[58] Field of Search ........... 325/51, 53, 54, 55, 161, 325/31, 162, 164; 343/180; 307/215, 242, 241, 239, 218; 178/DIG. 13

[56] References Cited
UNITED STATES PATENTS

| | | | |
|---|---|---|---|
| 3,078,375 | 2/1963 | Hedges et al. | 325/162 |
| 3,248,573 | 4/1966 | Spandorfer et al. | 307/215 |
| 3,484,694 | 12/1969 | Brothman et al. | 325/55 |
| 3,794,922 | 2/1974 | Osborn et al. | 325/31 |

OTHER PUBLICATIONS

Digital Logic Handbook, Digital Equipment Corporation, 1970, p. 106.

G. E. Transistor Manual, 1964, p. 184.

Primary Examiner—George H. Libman
Attorney, Agent, or Firm—Warren H. Kintzinger

[57] ABSTRACT

An all saturated switching mode solid state gate device logic element used as an RF amplifier transmitter in a communication system.

3 Claims, 1 Drawing Figure

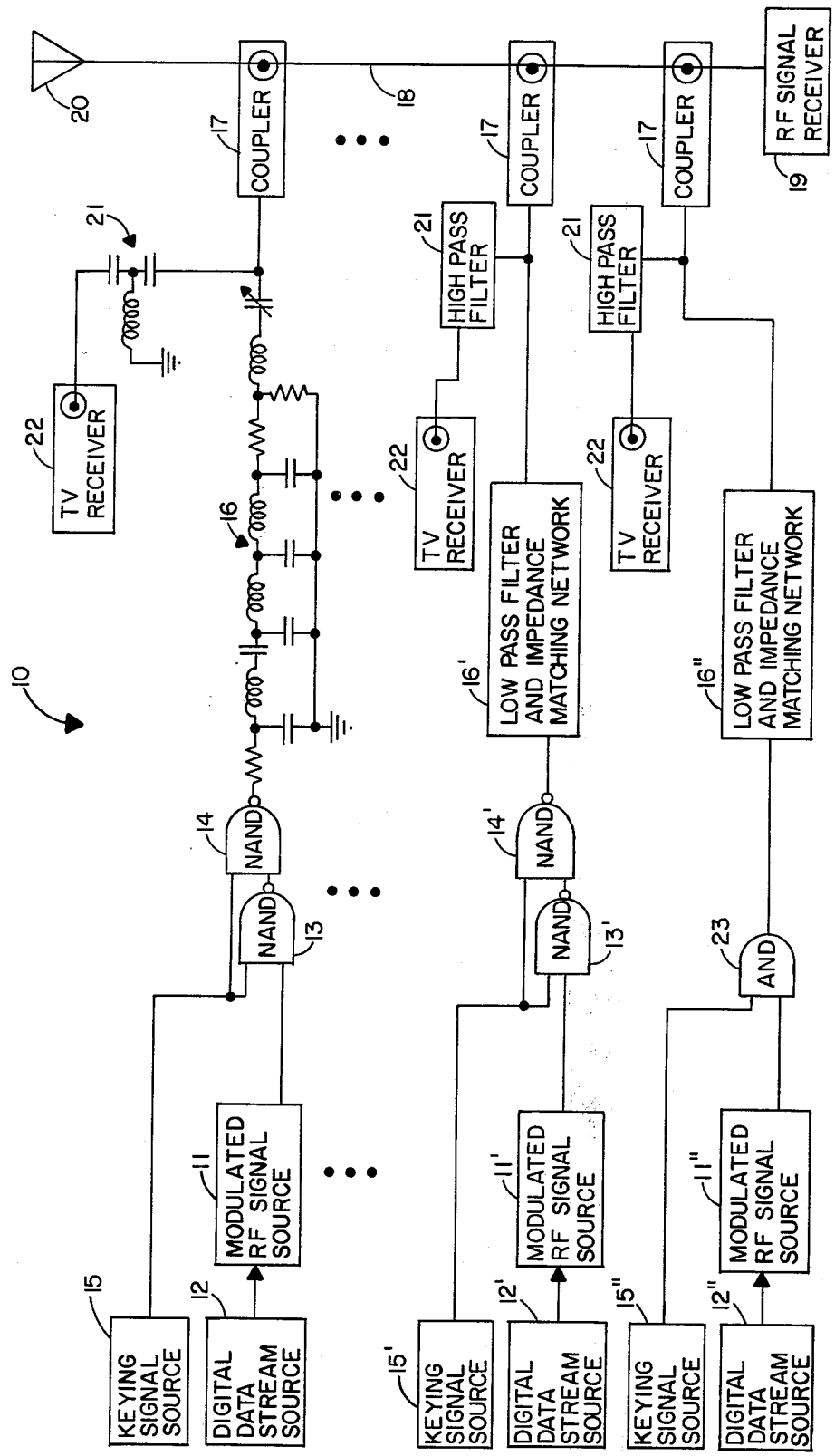

ALL SATURATED SWITCHING MODE SOLID STATE RF AMPLIFIER

This invention relates in general to RF signal transmitting systems, and in particular, to an RF signal transmitting system using all saturated switching mode solid state gate device logic elements as RF amplifier transmitters much like a power amplifier stage of an RF transmitter.

There are various RF communication systems having a plurality of transmitter locations transmitting to a common receiver or to several receiver locations much fewer in number than the transmitter locations. With many of these systems, originating RF signal sources are not suitable for supplying the output directly and must be connected through RF power amplifier staging to achieve desired RF output signal levels to the communications system. Such systems involve, in many instances, cable distribution interconnects, and with a multiplicity of RF transmitter inputs the RF power amplifier staging systems must be not only highly reliable and readily available, but must also be relatively simple and inexpensive. Further, it is important that adequate db isolation be provided through RF power amplifier staging for the operational keyed-off state of such RF power amplifier staging.

It is, therefore, a principal object of this invention to provide an RF transmitter interconnect to communication systems employing RF power staging elements relatively simple and inexpensive, yet highly reliable and readily available for installation and use.

Another object is for such RF power staging to include as the RF output element an all saturated switching mode solid state gate device logic element.

Features of this invention useful in accomplishing the above objects include, in an improved RF amplifier transmitter useful in an RF cable communication system, use of gated logic elements in the form of all saturated switching mode solid state gate devices as RF signal amplifier transmitters to the communication system. These all saturated switching mode solid state devices are, selectively, in the form of NAND and AND gate TTL, RTL, and/or DTL logic devices as appropriate for individual circuit needs and RF signal control desired while attaining desired db isolation levels individually or through cascading of the solid state logic devices as required. Many such devices may be arranged into a communication network to supply information to a single or, at most, very few receivers, and with a disiple such that generally only one of the many RF sources at any given time is supplying RF signal information into the communication network. It is necessary, therefore, that idle RF sources have a high db attenuation so as to not be a source of damaging interference to that RF source that is active at a given time.

A specific embodiment representing what is presently regarded as the best mode of carrying out the invention is illustrated in the accompanying drawing that is a block schematic diagram of applicant's system using all saturated switching mode solid state RF amplifier logic elements.

Referring to the drawing:

The RF signal transmitting system 10, as shown by the single figure, is shown to have an RF signal source 11 with a digital data stream modulating signal source 12 supplying a modulating input signal, and an output connection to an input of NAND gate 13. The output of NAND gate 13 is connected as an input to NAND gate 14, and a keying signal source 15 is connected as the second input to both NAND gates 13 and 14. Thus, NAND gate 14 is an all saturated TTL switching mode solid state gate device logic element in use as an RF amplifier transmitter much like a power amplifier stage of an RF transmitter. NAND gates 13 and 14, that are inexpensive, reliable, and readily available, are TTL logic switching mode active devices with outputs very rich in harmonic content, so the output of NAND gate 14 is connected through low pass filter and impedance matching network 16 to a coupler 17 connection with a coax cable 18 connected to an RF signal receiver 19. Cable 18 is shown to be part of a master antenna television (MATV) cable system having a conventional TV video receiving antenna 20, and connected, in addition to RF signal receiver 19, through couplers 17 and high pass filters 21 to TV receivers 22.

The two NAND gates 13 and 14 are connected in series cascade with the keying signal from keying signal source 15 being half of each dual input to the NAND gates. In a working circuit isolation from the output circuit of the RF signal source 11 is provided by two stages of TTL NAND logic gates (four stages being provided by a single series 7400 TTL integrated circuit) with two stages employed to attain approximately 60 db attenuation rather than slightly less than 40 db attenuation when the key signal is OFF. This circuit is duplicated for a plurality of like transmitters down to NAND gates 13' and 14', their associated inputs from digital data stream source 12' fed modulated RF signal source 11' and keying signal source 15', and the output connection through low pass filter and impedance matching network 16' to the connective junction of the high pass filter 21 and cable 18 coupler 17 of that location.

In another RF signal generating and transmitting location, a single TTL logic switching mode all saturated solid state AND gate 23 is used in place of two NAND gates used in other transmitting locations. This is with the two input connections to AND gate 23 being from digital data stream source 12'' fed modulated RF signal source 11'' and keying signal source 15'', and the output connection to low pass filter and impedance matching network 16''. Please note that in addition to the TTL logic devices shown, other all saturated switching mode solid state devices such as RTL and DTL devices in the form of NAND and AND gate logic elements could also be used as logic elements developing RF signal outputs as RF amplifier transmitters much like a power output amplifier stage of an RF transmitter in place of the NAND and AND gates in the circuit shown.

Whereas this invention is herein illustrated and described with respect to several embodiments hereof, it should be realized that various changes may be made without departing from essential contributions to the art made by the teachings hereof.

I claim:

1. In an RF signal cable communications system: an RF signal source; a keying signal source; all saturated switching mode solid state logic element means having a plurality of inputs including input connective means from both said RF signal source and said keying signal source; with output connective means from said logic element means to cable in said cable communication system as an RF power amplifier stage transmitting to the cable communication system; wherein said all saturated switching mode solid state logic element means includes a plurality of individual all saturated switching mode solid state logic element devices connected in series cascade at an RF transmitter location; and with keying signal being fed through connective means from said keying signal source as half of dual inputs to said logic element devices.

2. The RF signal communication system of claim 1, wherein said plurality of individual all saturated switching mode solid state logic element devices are NAND gates.

3. The RF signal communication system of claim 1, wherein a combination low pass filter and impedance matching network circuit is included in said output connective means.

* * * * *